US012056116B2

(12) United States Patent
Singh et al.

(10) Patent No.: US 12,056,116 B2
(45) Date of Patent: *Aug. 6, 2024

(54) NESTED QUERY ANALYSIS TOOL

(71) Applicant: Oracle International Corporation, Redwood Shores, CA (US)

(72) Inventors: Prashant Singh, Lexington, MA (US); Rasika Vaidya Kaura, Dublin, CA (US); Henrik Michael Ammer, Auburn, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,838

(22) Filed: Jul. 10, 2023

(65) Prior Publication Data
US 2023/0350884 A1   Nov. 2, 2023

Related U.S. Application Data

(63) Continuation of application No. 17/449,632, filed on Sep. 30, 2021, now Pat. No. 11,741,088.
(Continued)

(51) Int. Cl.
*G06F 16/242* (2019.01)
*G06F 3/0482* (2013.01)
(Continued)

(52) U.S. Cl.
CPC ........ *G06F 16/2428* (2019.01); *G06F 3/0482* (2013.01); *G06F 3/0486* (2013.01);
(Continued)

(58) Field of Classification Search
CPC .. G06F 16/2428; G06F 3/0482; G06F 3/0486; G06F 16/24535; G06F 16/2458;
(Continued)

(56) References Cited

U.S. PATENT DOCUMENTS 9,330,139 B2    5/2016   Chen et al.
10,275,493 B1   4/2019   Mostak
(Continued)

FOREIGN PATENT DOCUMENTS

CN          112236765 A      1/2021

*Primary Examiner* — Yuk Ting Choi
(74) *Attorney, Agent, or Firm* — Invoke

(57) ABSTRACT

Techniques for tracing attributes through queries in a set of nested queries are disclosed. A graphical user interface displays individual sub-queries as separate visual representations. Based on detecting a selection, a system analyzes data underlying the visual representations to identify queries, among the set of nested queries, that are associated with a particular attribute. One selection results in the system analyzing the underlying data to identify an origin query for an attribute, from among the set of nested queries. Another selection results in the system analyzing the underlying data to identify queries, from among the set of nested queries, that use the attribute received from a selected query. Another selection results in the system generating SQL code for a selected subset of queries, among the set of nested queries.

20 Claims, 9 Drawing Sheets

Related U.S. Application Data

(60) Provisional application No. 63/200,474, filed on Mar. 9, 2021, provisional application No. 63/155,817, filed on Mar. 3, 2021, provisional application No. 63/148,864, filed on Feb. 12, 2021, provisional application No. 63/147,564, filed on Feb. 9, 2021.

(51) Int. Cl.
   *G06F 3/0486*    (2013.01)
   *G06F 16/2453*   (2019.01)
   *G06F 16/2458*   (2019.01)
   *G06F 16/248*    (2019.01)
   *G06F 16/25*     (2019.01)

(52) U.S. Cl.
   CPC .... *G06F 16/24535* (2019.01); *G06F 16/2458* (2019.01); *G06F 16/248* (2019.01); *G06F 16/258* (2019.01); *G06F 2203/04803* (2013.01)

(58) Field of Classification Search
   CPC ............... G06F 16/248; G06F 16/258; G06F 2203/04803; G06F 3/0481
   See application file for complete search history.

(56) References Cited

U.S. PATENT DOCUMENTS

| | | | |
|---|---|---|---|
| 10,331,899 B2 | 6/2019 | Pattabhiraman et al. | |
| 10,341,172 B1 | 7/2019 | Vanden et al. | |
| 10,592,506 B1 | 3/2020 | Thombre et al. | |
| 10,817,576 B1 | 10/2020 | Davidovich et al. | |
| 11,030,192 B2 | 6/2021 | James et al. | |
| 11,216,511 B1 | 1/2022 | Bigdelu et al. | |
| 11,263,268 B1* | 3/2022 | Bourbie | G06F 16/2228 707/722 |
| 11,636,128 B1* | 4/2023 | Bigdelu | G06F 16/2428 707/722 |
| 11,644,955 B1* | 5/2023 | Singamneni | G06F 3/0481 707/722 |
| 2004/0243799 A1 | 12/2004 | Hacigumus et al. | |
| 2005/0015361 A1 | 1/2005 | Payton et al. | |
| 2006/0074878 A1 | 4/2006 | Miller | |
| 2006/0235828 A1 | 10/2006 | Dettinger et al. | |
| 2007/0136239 A1 | 6/2007 | Lee et al. | |
| 2009/0055367 A1 | 2/2009 | Colgrave et al. | |
| 2010/0161646 A1 | 6/2010 | Ceballos et al. | |
| 2013/0247207 A1 | 9/2013 | Hugard et al. | |
| 2013/0290294 A1 | 10/2013 | Fuller et al. | |
| 2014/0189548 A1 | 7/2014 | Werner | |
| 2014/0229462 A1 | 8/2014 | Lo | |
| 2015/0120776 A1 | 4/2015 | Gopalan et al. | |
| 2015/0378693 A1 | 12/2015 | Boag et al. | |
| 2016/0140166 A1 | 5/2016 | Schechter et al. | |
| 2017/0193127 A1 | 7/2017 | Chen et al. | |
| 2017/0337232 A1 | 11/2017 | Caspi et al. | |
| 2018/0032574 A1 | 2/2018 | Vandenberg | |
| 2018/0089263 A1 | 3/2018 | Gerard | |
| 2018/0089265 A1 | 3/2018 | Gerard | |
| 2019/0188203 A1 | 6/2019 | James et al. | |
| 2020/0073983 A1 | 3/2020 | Sen et al. | |
| 2020/0342018 A1 | 10/2020 | Lange et al. | |
| 2021/0034621 A1 | 2/2021 | Patel et al. | |
| 2021/0124781 A1* | 4/2021 | Tabb | G06F 16/9024 707/722 |
| 2021/0173851 A1 | 6/2021 | Dorne et al. | |
| 2022/0329616 A1 | 10/2022 | O'Hearn et al. | |

* cited by examiner

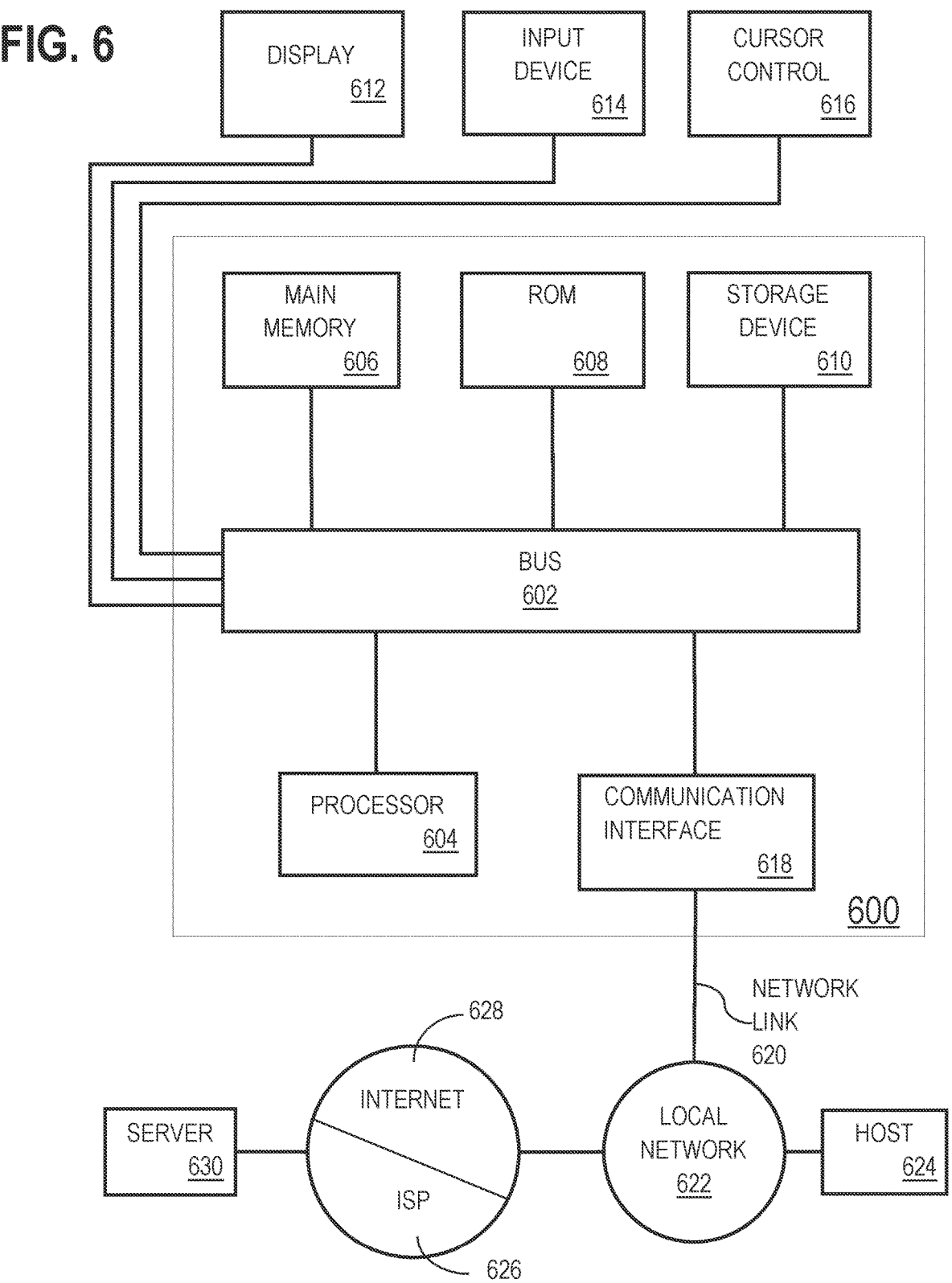

NESTED QUERY ANALYSIS TOOL

INCORPORATION BY REFERENCE; DISCLAIMER

Each of the following applications are hereby incorporated by reference: application Ser. No. 17/449,632, filed on Sep. 30, 2021; application 63/200,474, filed Mar. 9, 2021; application 63/155,817, filed Mar. 3, 2021; application 63/148,864, filed Feb. 12, 2021; application 63/147,564, filed Feb. 9, 2021. The applicant hereby rescinds any disclaimer of claims scope in the parent application(s) or the prosecution history thereof and advise the USPTO that the claims in the application may be broader that any claim in the parent application(s).

TECHNICAL FIELD

The present disclosure relates to a visualization tool for displaying and executing operations for nested queries. In particular, the present disclosure relates to a system and user interface including an interactive visual representation for analyzing characteristics and generating structured query language (SQL) code for sub-sets of queries in a set of nested queries.

BACKGROUND

Database systems store vast amounts of data that is accessible by end users. To generate actionable information from the data stored in the database system, users execute queries that filter records returned from the database system to only those records applicable to the user. For example, a user may generate a query to retrieve only records from a defined object having defined values for a defined attribute. Often, queries are written with multiple layers of sub-queries, each layer performing one or both of filtering data from a sub-query lower in the hierarchy and filtering data from an object in the database. The sub-queries output attribute data to parent queries. Complex queries may include many layers of nested sub-queries. Each sub-query may include multiple data retrieval operations from one or more objects and/or multiple operations to filter retrieved data prior to outputting the data. As a result of multiple and complex nested relationships between queries, and multiple operations performed by each query, complex queries may appear unintelligible to anyone other than the author of a query.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 shows a block diagram that illustrates a computer system in accordance with one or more embodiments.

DETAILED DESCRIPTION

Figure 1A:
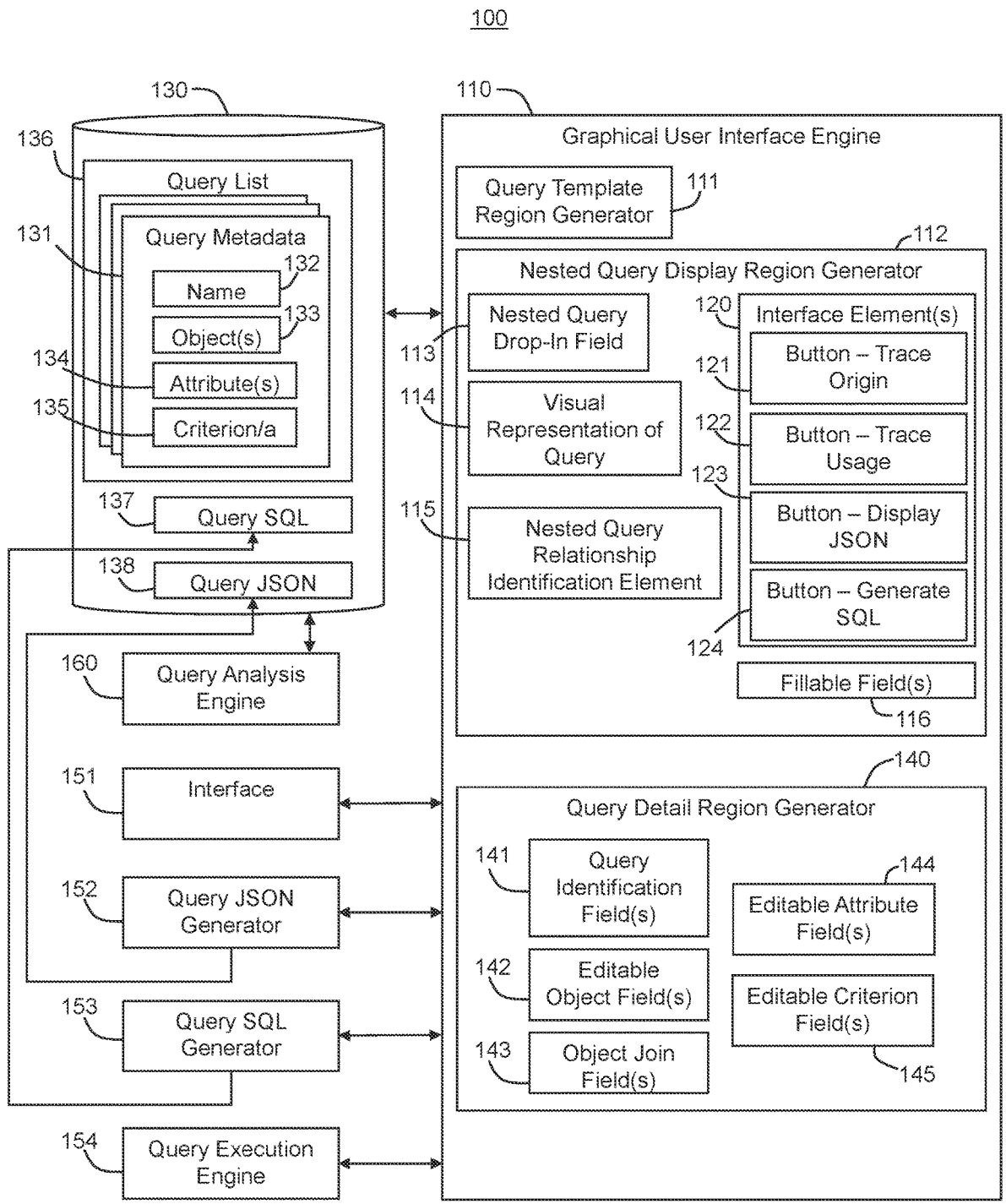
FIGS. 1A and 1B illustrate a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. OPERATIONS FOR TRACING ATTRIBUTES THROUGH QUERIES IN A SET OF NESTED QUERIES
4. TRACING AN ORIGIN OF AN ATTRIBUTE TO A SUB-QUERY OF A SET OF NESTED QUERIES
5. TRACING THE USAGE OF AN ATTRIBUTE THROUGHOUT A SET OF NESTED QUERIES
6. SQL CODE SELECTION IN INTERACTIVE QUERY BUILDER
7. COMPUTER NETWORKS AND CLOUD NETWORKS
8. MISCELLANEOUS; EXTENSIONS
9. HARDWARE OVERVIEW

1. GENERAL OVERVIEW

One or more embodiments implement an interactive query builder for a composite query comprising a set of nested sub-queries. The interactive query builder allows a user to observe, analyze, and modify query characteristics and attributes of the sub-queries in the set of nested queries. The system displays an interactive visual depiction of the set of nested sub-queries. The interactive visual depiction includes visual representations of each of the set of nested sub-queries. The visual representations of the nested sub-queries are positioned relative to each other based on the relationships between the nested sub-queries. Accordingly, the interactive visual depiction indicates, via positioning of the visual representations, the relationships between the nested sub-queries.

In one or more embodiments, the system displays user interface elements in the interactive visual depiction of the set of sub-queries. Examples herein refer to specific types of user interface elements such as buttons, icons, and checkboxes. However, these examples are equally applicable to any other type of user interface element. In one example, the system displays a query detail region alongside a nested query display region. The query detail region includes buttons and editable fields for editing one or more queries in the set of nested queries.

In one embodiment, the nested query display region or the query detail region includes an interface element for tracing an origin of a data attribute in a query. User selection of the interface element results in the system tracing an origin of the attribute to a child query within the composite query. Tracing the origin of the attribute may include analyzing JSON data for a query and any child queries to determine an origin query for the data attribute. The system may display a visual indicator in the nested query display region associated with the origin query for the selected attribute. For example, the system may highlight each sub-query in the set of nested queries through which the selected attribute passes. Alternatively, the system may highlight only an origin query by which the selected attribute is retrieved from a data object. In one embodiment, the query detail region displays output attributes for selected queries. The system detects a selection of an interface element to trace an origin of one of the output attributes for the selected query. While maintaining the display of the characteristics of the selected query in the query detail region, the system modifies a display of the set of nested queries in the nested query display region. The system may modify the display of the set of nested queries to provide visual representations for each child query that includes the selected data attribute as an output attribute. The system may further modify the display of the set of nested queries to provide a unique visual representation for the query in the set of nested queries that is the origin for the selected data attribute.

The nested query display region includes another button to trace the usage of an attribute from a selected query to one or more parent queries in the composite query. The system analyzes each parent query of a selected query to determine whether the parent query includes the attribute as an input attribute. The system displays a visual indicator associated with one or more parent queries of the selected query that receive the attribute as an input attribute. For example, the system may highlight each parent sub-query in the set of nested queries through which the selected attribute passes. Alternatively, the system may highlight only a terminal parent query in the set of nested queries that receives the attribute as the input attribute. terminal parent query in the set of nested queries that receives the attribute as the input attribute may be the top-most query of all the sub-queries in the set of nested queries. However, in another example, a sub-query in the set of nested queries that is below the top-most query may receive the attribute as an input without passing on the attribute as an output. For example, a sub-query may perform an operation on a value of an attribute to pass to a parent query an attribute of a different name. Alternatively, a user may discover a query that receives an attribute without passing on the attribute or performing any function on the attribute. The user may edit the set of nested queries to use or delete the attribute. In one example, the system traces the usage of the data attribute only upward in the hierarchy of nested queries through parent queries. According to another example, the system traces the usage of the data attribute both through parent queries and through child queries.

In one or more embodiments, the system generates JSON data describing the compound query displayed by the set of nested queries. The system converts the JSON data to SQL code associated with one or more SQL database dialects. The system may display to the user a preview of one or both of the JSON code and the SQL code prior to executing the SQL code.

In one or more embodiments, selection of an interface element associated with a particular sub-query results in the system displaying SQL code for the particular sub-query. The system may refrain from displaying SQL code for any other sub-queries in the set of nested queries. In addition, the system may display the SQL code concurrently with displaying the set of nested queries. In one or more embodiments, the system displays the SQL code in an editable field. Editing the SQL code may result in editing values in one or both of the query display region and the query detail region. The system may also provide a user interface element to allow a user to select an SQL dialect into which to convert the JSON data. Accordingly, the same set of nested queries represented by the same JSON data may used to generate SQL code for different databases using different SQL dialects.

One or more embodiments described in this Specification and/or recited in the claims may not be included in this General Overview section.

2. ARCHITECTURAL OVERVIEW

Figure 1B:
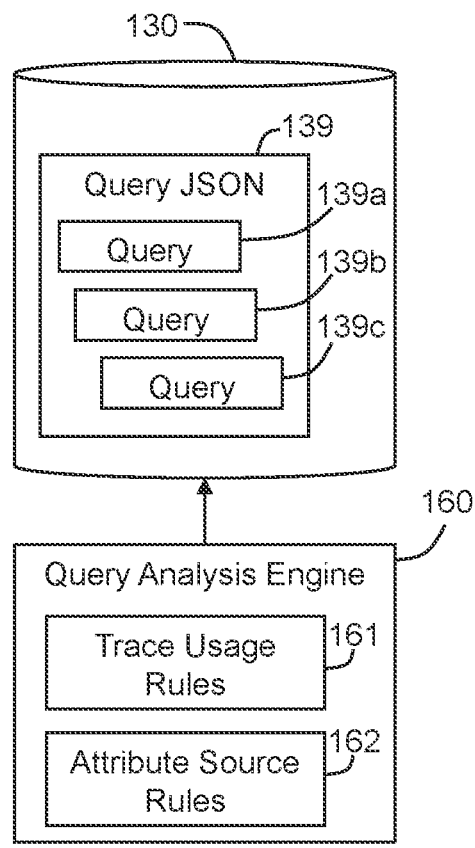

FIGS. 1A and 1B illustrates a system 100 in accordance with one or more embodiments. As illustrated in FIG. 1A, system 100 includes a graphical user interface (GUI) engine 110, a data repository 130, an interface 151, a query JSON generator 152, a query SQL generator 153, and a query execution engine 154.

The GUI engine 110 includes a selectable metadata region generator 111, a nested query display region generator 112, and a query detail region generator 140. The selectable metadata region generator 111 obtains query metadata 131 from the data repository 130.

In one or more embodiments, the query metadata 131 includes a list 136 of query templates having different characteristics. Examples of query characteristics included in the metadata include a query name 132, an object 133 associated with the query, attributes 134 input to/output from/operated on by the query, and other criteria 135 defining values obtained by the query. Examples of criteria include operands to be applied to attributes when the query is executed and ranges of values for attributes to be returned when the query is executed.

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the graphical user interface engine 110. Alternatively, or additionally, a data repository 130 may be implemented or executed on a computing system separate from the graphical user interface engine 110. A data repository 130 may be communicatively coupled to the graphical user interface engine 110 via a direct connection or via a network.

Information describing query metadata 131 may be implemented across any of components within the system 100. However, this information is illustrated within the data repository 130 for purposes of clarity and explanation.

The nested query display region generator 112 generates a nested query display region. The nested query display region may include, for example, a nested query drop-in field 113. The nested query display region generator 112 generates a nested query responsive to detecting a drag-and-drop action of the interface 141. In one or more embodiments, the nested query display region includes a visual representation of a query 114. A visual representation of a query 114 may be, for example, a geometric shape, such as a rectangle. The name of the query may be displayed in the geometric shape. In one or more embodiments, user interface elements 120 are displayed in the visual representation of a query 114. Examples include a "details" button, a drop-down menu, and an "edit" button.

In one or more embodiments, the nested query display region generator 112 includes functionality to display a "Trace Origin" button 121. Selection of the "Trace Origin" button 121 causes the query analysis engine 160 to analyze a set of nested queries displayed in the nested query drop-in field 113 to identify the origin query of a selected attribute. In one or more embodiments, the interface elements 120 include a "Trace Usage" button 122. Selection of the "Trace Usage" interface element 122 causes the query analysis engine 160 to analyze the set of nested queries displayed in the nested query drop-in field 113 to identify any queries that receive the selected attribute as an input attribute. The query analysis engine 160 may analyze a set of nested queries displayed in a nested query display region by analyzing the JSON data associated with the sub-queries in the set of nested queries.

As illustrated in FIG. 1B, the query analysis engine 160 includes attribute trace rules 161 and attribute source rules 162. In addition, the data repository 130 stores the JSON data representing a composite query 139. The composite query 139 is a set of nested queries comprising sub-queries 139a, 139b, and 139c. Selection of the "Trace Origin" interface element 121 causes the query analysis engine 160 to apply the attribute source rules 162 to the JSON data of the composite query 139 to identify a source sub-query for the selected attribute. An example of attribute source rules 162 includes rules to analyze each JSON data for each sub-query that is a child of a selected query sequentially, in order from a sub-query closest to the selected sub-query to a sub-query that is farthest from the selected sub-query, until an origin query is identified. The rules may include instructions to stop the analysis, or refrain from analyzing any further child queries, once the source sub-query is identified. The rules 162 may include rules for the types of information to be displayed upon identifying a source sub-query. For example, the system may display in a nested query display region an attribute name, object name, sub-query name, attribute record count at the source sub-query, or other information associated with the source sub-query. The rules 162 may include rules to provide visual indicators of each sub-query between the selected sub-query and the source sub-query. For example, the query analysis engine 160 may cause the nested query display region generator 112 to generate particular visual indicators associated with sub-queries, including: highlighting each sub-query between the selected sub-query and the source sub-query, and displaying a symbol or information about the selected attribute for each sub-query. For example, in one embodiment, the query analysis engine 160 outputs information to the nested query display region generator 112 to display a count of the number of records associated with the selected attribute by each sub-query between the selected query and the source sub-query.

In one or more embodiments, selection of the "Trace Usage" interface element 122 causes the query analysis engine 160 to apply the "trace usage" rules 161 to the JSON data of the composite query 139 to identify each parent query of the selected query that includes the attribute as an input attribute. An example of "trace usage" rules 161 includes rules to analyze each sub-query that is a parent of a selected query sequentially, in order from a sub-query closest to the selected sub-query to a sub-query that is farthest from the selected sub-query, until a parent query is identified that does not receive the selected attribute as an input attribute. The rules 161 may include instructions to stop the analysis, or refrain from analyzing any further parent queries, once the particular parent query is identified that does not receive the selected attribute as an input attribute. The rules 161 may include rules for the types of information to be displayed upon tracing the attribute to each parent sub-query in the composite query 139. For example, in one embodiment, the query analysis engine 160 may provide information to the nested query display region generator 112 to display an attribute name, object name, sub-query name, attribute record count at the source sub-query, or other information associated with a terminal sub-query (e.g., the last query in the chain of sub-queries to receive the attribute as an input attribute). In one embodiment, the query analysis engine 160 applies the rules 161 to generate data regarding a condition applied to the selected attribute, or a function performed using the selected attribute, by a sub-query. The rules 161 may include rules to provide visual indicators of each sub-query between the selected sub-query and the particular parent sub-query. For example, the query analysis engine 160 may provide information to the nested query display region generator 112 to generate a visual indicator for a sub-query, including: highlighting each sub-query between the selected sub-query and the particular parent sub-query, and displaying, for each sub-query, a symbol or information about the selected attribute. For example, in one embodiment, the query analysis engine 160 outputs information to the nested query display region generator 112 to display a count of the number of records associated with the selected attribute by each sub-query between the selected query and the source sub-query.

In one or more embodiments, the nested query display region generator 112 includes functionality to display a "Display JSON" interface element 123. Selection of the "Display JSON" interface element 123 may result in the system displaying JSON data for a selected query. The system may update query characteristics displayed in one or both of a nested query display region and a query detail region based on detecting edits to the displayed JSON data.

In one or more embodiments, the nested query display region generator 112 includes functionality to display a "Generate SQL" interface element 124. Selection of the "Generate SQL" interface element 124 may result in the system displaying SQL code for a selected query. For example, the system may convert the JSON data representing the selected query into a pre-defined SQL dialect, or to an SQL dialect selected by a user. The system may update query characteristics displayed in one or both of a nested query display region and a query detail region based on detecting edits to the displayed SQL code. The system may also update the JSON data representing the selected query based on detecting the edits to the displayed SQL code.

In one or more embodiments, the visual representation of the query 114 has fillable fields 126 displayed inside the visual representation of the query 114. Examples of fillable fields include a field to edit a query name, to edit an object name associated with the query, to enter attribute names associated with the query, or to enter one or more criteria associated with the query.

In one or more embodiments, a nested query relationship identification element 115 displays a visual representation of a nested relationship between two queries. For example, in an embodiment in which the queries are displayed as geometric shapes, one geometric shape may be arranged relative to the other to indicate a nested relationship. For example, each child query may be offset by its parent query by a pre-defined distance. Examples of nested query relationship identification elements include offsets, spatial relationships between queries, buttons identifying a query as one or both of a parent/child, and color-coding queries.

The query detail region generator 140 generates a query detail region for a selected query. For example, the nested query display region generator 112 may display a set of nested queries of a composite query as geometric shapes. Responsive to detecting a selection of one of the nested queries, the query detail region generator 140 displays alongside the nested query drop-in field 113 additional fields containing further detail regarding characteristics of the selected query. Query identification fields 141 include, for example, a query name, a name of query metadata used to generate the query, and a unique identifier for the query.

The editable object field 142 is an editable field occupied by the name of the object or objects accessed by the query upon execution of the query. In one or more embodiments, the editable object field 142 includes a drop-down menu or list of selectable objects. In one or more embodiments, the editable object field 142 receives inputs to type or enter an object name, or a portion of an object name, and the query detail region generator 140 searches the objects accessible by the query execution engine 154 to determine if there is a matching object.

The "object join" field 143 receives an input to select one or more additional objects to be added to the selected query. In one or more embodiments, when the system 100 detects a selection of an additional object to be added to the query, the nested query display region generator 112 automatically generates a representation of a new child query associated with the selected query.

The editable attribute field 144 receives an input to select attributes that will affect the output of the query. For example, if an object associated with the query includes five attribute fields, the editable attribute field 144 may include a drop-down menu or list of the five attributes stored by the object. The editable attribute field 144 may receive a selection of one or more of the attributes that will be retrieved, excluded, or operated on to generate a query output.

The editable criterion field 145 receives an input to select one or more criteria to be applied to objects, attributes, and/or attribute values to return one or more output values from the query. For example, the editable criteria field 145 may receive an input to include two attribute values and a Boolean AND operator as a criterion to return only records from an object having both of the selected attribute values.

The system 100 includes an interface 151 to allow a user to interact with the GUI engine 110. In one or more embodiments, interface 151 refers to hardware and/or software configured to facilitate communications between a user and the graphical user interface engine 110. Interface 151 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 151 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 151 is specified in one or more other languages, such as Java, C, or C++.

A query JSON generator 152 renders the set of nested queries displayed by the nested query display region generator as JSON data prior to executing the queries. As the GUI engine 110 adds nested queries and modifies characteristics of the queries, the query JSON generator 152 updates the JSON data accordingly. In one or more embodiments, selection of the "Display JSON" interface element 123 causes the query JSON generator 152 to generate and display a selected sub-query as JSON data. The query JSON data 138 may be stored in the data repository 130.

A query SQL generator 153 generates the nested queries in SQL language. In one or more embodiments, selection of the "Generate SQL" interface element 124 causes the query SQL generator 153 to convert JSON data into SQL code and to display the SQL code. The query SQL code 137 may be stored in the data repository 130. In one or more embodiments, the SQL generator 153 displays the SQL code associated with a selected query without displaying the SQL code for a child query of the selected query. The SQL generator 153 may also generate the SQL code associated with a selected query without generating the SQL code for a parent query of the selected query.

A query execution engine 154 executes the nested queries by executing the SQL code to return records from one or more databases. In one or more embodiments, the GUI engine 110 includes an interface element to execute the SQL code associated with a selected nested query without executing the SQL code associated with a parent query.

In one or more embodiments, the system 100 may include more or fewer components than the components illustrated in FIGS. 1A and 1B. The components illustrated in FIGS. 1A and 1B may be local to, or remote from, each other. The components illustrated in FIGS. 1A and 1B may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 7, titled "Computer Networks and Cloud Networks."

In one or more embodiments, the GUI engine 110 refers to hardware and/or software configured to perform operations described herein for displaying query metadata, displaying a set of nested queries, and displaying a query detail region for a selected query among the set of nested queries. Examples of operations for displaying and modifying a set of nested queries are described below with reference to the figures that follow.

In an embodiment, the GUI engine 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. OPERATIONS FOR TRACING ATTRIBUTES THROUGH QUERIES IN A SET OF NESTED QUERIES

Figure 2A:
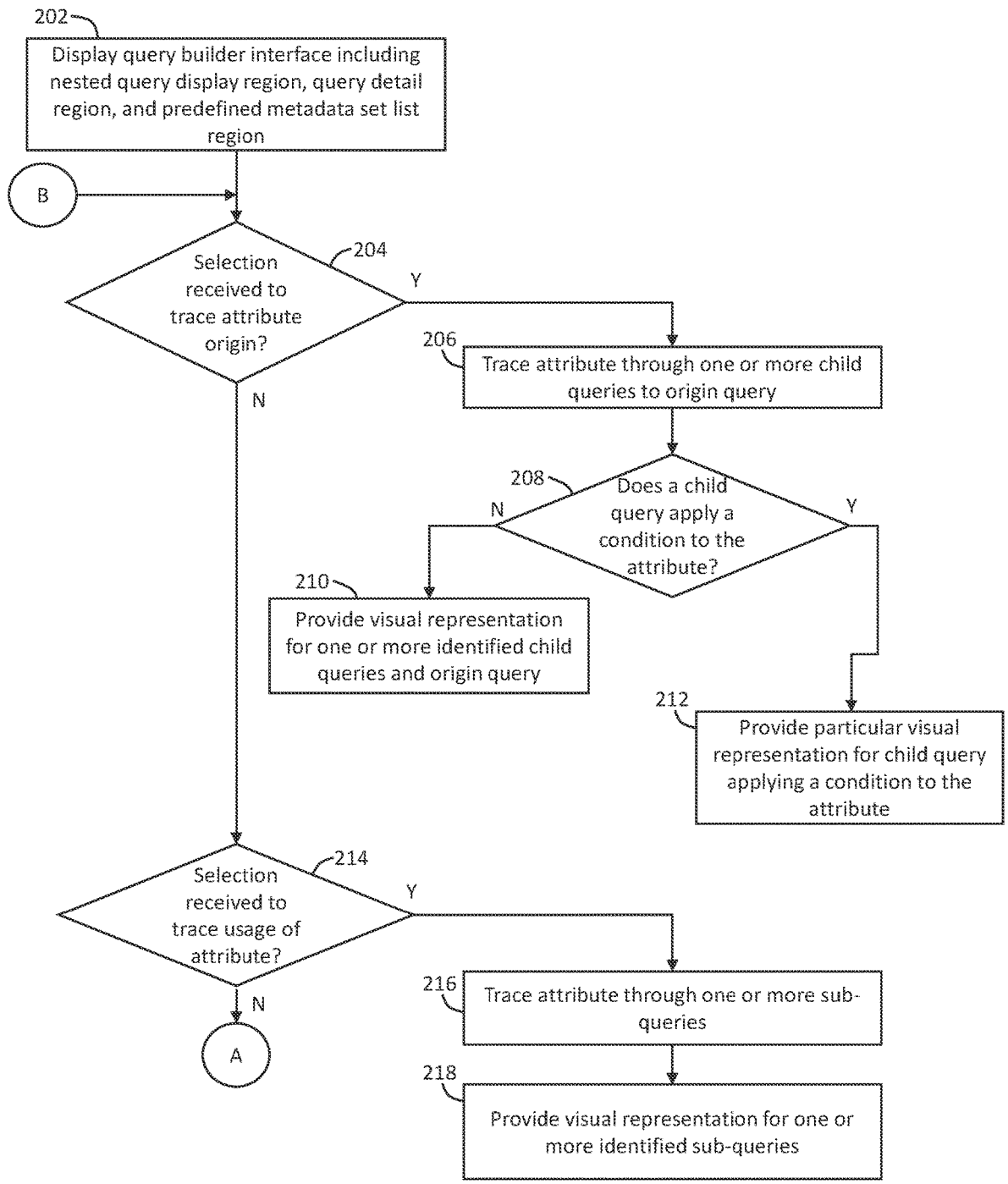
FIGS. 2A and 2B illustrate an example set of operations for analyzing characteristics of sub-sets of queries in a set of nested queries in accordance with one or more embodiments.
Figure 2B:
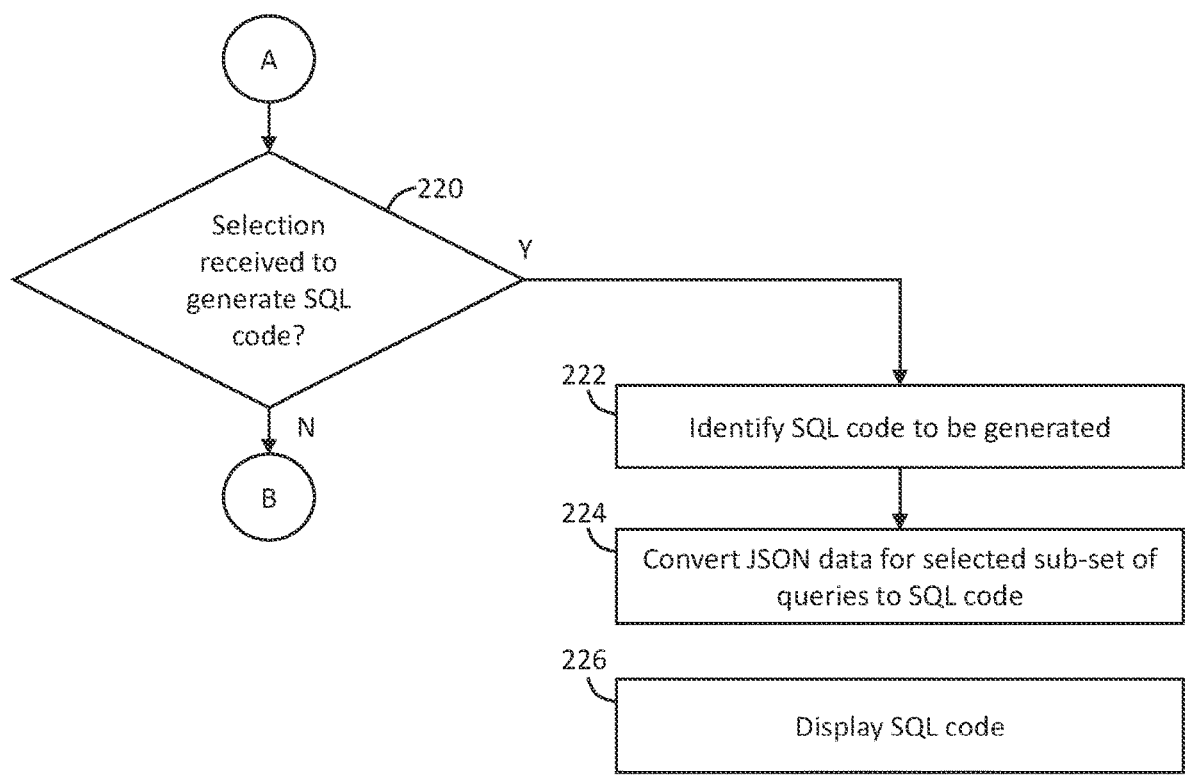

FIGS. 2A and 2B illustrate an example set of operations for analyzing characteristics of one or more sub-queries in a set of nested queries in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

In one or more embodiments, a system displays a query builder user interface (Operation 202). The user interface includes a nested query display region and a query detail region. The nested query display region may be adjacent to, and non-overlapping with, the query detail region. The nested query display region may display a set of nested queries. The set of nested queries may be displayed as a set of distinct visual representations arranged relative to each other to convey a parent/child relationship among the queries.

For example, in one embodiment, each query of a set of nested queries is displayed as a geometric shape on a background. Each geometric shape may be separate from each other geometric shape. The geometric shapes may be separated from each other by a contiguous region of the background, unbroken by connecting elements, such as lines. Instead, a parent/child relationship may be conveyed by the location of each geometric shape relative to each other geometric shape. For example, each child query may be represented as a geometric shape that is arranged below, and indented to the right of, a geometric shape representing its respective parent query. The geometric shape representing the child query may overlap the shape representing the parent query in the horizontal direction without overlapping the shape representing the parent query in the vertical direction. A shape representing a child query may be indented by a pre-defined distance—such as 1.27 centimeters or 0.5 inches. Alternatively, the shape representing the child query may be indented by a certain percentage of the length of the shape. For example, the shape representing the child query may overlap the shape of the parent query along 80% of the length of shape of the parent query.

The query detail region may include a set of editable fields associated with a particular query in the nested query display region. The query detail region may display a set of characteristics associated with a query. The set of characteristics may include a name of a query, a data object associated with the query, a description of the query, output attributes of the query, and criteria associated with the output attributes of the query. The visual representation of the query in the nested query display region may display a sub-set of the set of characteristics. For example, the visual representation of the query in the nested query display region may display only a name of the query. In addition, the visual representation of the query in the nested query display region may not include an editable field.

In one or more embodiments, the query builder interface further includes a third region displaying a list of predefined sets of metadata. The predefined sets of metadata correspond to predefined modifications to existing queries, or to new queries. For example, one set of metadata may specify a data object and a data attribute pertaining to the data object. Another set of metadata may specify one or more functions to be performed by a query on a set of retrieved data.

The system determines whether a selection is received to trace an attribute to its origin in a set of nested queries (Operation 204). For example, in one embodiment, the nested query display region includes an interface element associated with a sub-query. The system may initiate operations to trace the attribute to an origin query upon detecting selection of the interface element. In addition, or in the alternative, the query detail region may include an interface element that, when selected, initiates tracing an attribute in the set of nested queries. The interface element may be a menu icon.

The system traces the attribute through one or more child queries to identify an origin sub-query in the set of nested sub-queries (Operation 206). The system may initiate an analysis of JSON data associated with the set of nested queries to trace an attribute to an origin query. In one embodiment, the system applies a set of rules to the JSON data of the composite query associated with the set of nested queries to identify each child query of the selected query that includes the attribute as an output attribute. The system may sequentially analyze each child query of the selected query, in order from a sub-query closest to the selected sub-query to a sub-query that is farthest from the selected sub-query, until the system identifies the origin query.

As an example, a sub-query in a set of nested queries may receive as an input attribute an attribute with a name "customer ID." Receiving the attribute as an input attribute may mean that a child query has obtained a set of records associated with values for the attribute from a data object. The selected sub-query may further analyze the set of records or pass the records (or address information of a location of the set of records) through to a parent sub-query. Upon receiving the selection to identify an origin query, the system may analyze the JSON data for any immediate child queries of the selected query to determine if any child queries include the attribute "customer ID" as an output attribute. If a child sub-query is identified that includes the attribute "customer ID" as an output attribute, the system further analyzes a next-level child query of the identified child query, to determine if the next-level child query includes the attribute "Customer ID" as an output attribute. The system eventually identifies the origin child query, in the set of nested queries, that performs a query of a data object having the records that include the attribute. The identified origin query may not receive the selected attribute as an input attribute.

The system may execute rules to stop the analysis, or refrain from analyzing any further child queries, once the origin query is identified that does not receive the selected attribute as an input attribute.

In one embodiment, the system determines whether a child query of a selected query applies one or more conditions to the selected attribute (Operation 208). For example, the system may identify in JSON data for a sub-query that receives an attribute "SensorValue" and applies a condition to the attribute. For example, the query may apply a condition to filter results returned by the query to only those results for which the attribute "SensorValue" has a value greater than "8." Alternatively, the system may determine that a sub-query receives the attribute "SensorValue" as an input attribute and also outputs the attribute "SensorValue" without applying any new conditions to the attribute.

Based on determining that no child queries apply conditions to an attribute value, the system displays visual indicators based on tracing an attribute to its origin sub-query (Operation 210). For example, system may generate a visual indicator, such as a highlight or other symbol, for each sub-query between the selected query and the origin query. The system may highlight one or both of the selected query and the origin query differently than any intervening queries. The system may refrain from highlighting any queries that are not along a path between the selected query and the origin query.

Based on determining that one or more child queries apply a condition to an attribute value, the system provides a visual representation for child queries that apply conditions to the attribute (Operation 212). For example, the system may generate one visual indicator, such as a highlight or other symbol, for each sub-query between the selected query and the origin query. The system may generate another visual indicator for queries that apply conditions to an attribute differently than other queries in the set of nested queries. For example, child queries that merely pass through an attribute may be highlighted with one color. Child queries that apply conditions to the attribute may be highlighted with another color. In addition, terminal queries (i.e., the selected query and the origin query) may be highlighted with yet another color.

In one embodiment, the visual indicator includes a results count associated with a particular attribute. For example, if a child query outputs two different attributes, the system may display in the nested query region only the results count for the selected attribute for which the origin query has been traced. Accordingly, the system may provide the user with a visual indication of how each child query between the selected query and the origin query affects a number of results returned based on the selected attribute.

In one or more embodiments, the system displays additional attribute information associated with the selected query, the origin query, and any intervening queries. For example, the system may display a name of the attribute in the origin query, a data object or data table from which data associated with the attribute is retrieved by the origin query, and a function or operation performed on data retrieved by the origin query.

Based on determining a selection has not been received to trace an origin of a particular attribute, the system determines whether a selection has been received to trace a usage of the attribute in the set of nested queries (Operation 214). Tracing the usage may include identifying any sub-queries within the set of nested queries that receives the selected attribute as an input attribute. In one embodiment, the nested query display region includes an interface element associated with a sub-query. When the system detects selection of the interface element, the system initiates operations to trace the usage of the attribute in the set of nested queries. In addition, or in the alternative, the query detail region may include an interface element that, when selected, initiates tracing usage of the attribute in the set of nested queries. The interface element may be a menu icon.

The system traces the attribute through one or more parent queries to identify a terminal query for the attribute in the set of nested sub-queries (Operation 216). The terminal query for the attribute is the last parent query in the set of nested queries to receive the attribute as an input attribute. The system may initiate an analysis of JSON data associated with the set of nested queries to trace the attribute to the terminal query. In one embodiment, the system applies a set of rules to the JSON data of the composite query associated with the set of nested queries to identify each parent query, from among a hierarchy of parent queries of the selected query, that includes the attribute as an input attribute. The system may sequentially analyze each parent query of the selected query, in order from a parent query closest to the selected sub-query to a parent query that is farthest from the selected sub-query, until the system identifies the terminal query.

In one embodiment, the system analyzes, based on detecting selection of the interface element to trace the usage of a selected attribute, only parent queries. In addition, or in the alternative, the system may further analyze child queries to identify any child queries that receive the attribute as an input attribute. For example, the system may detect a selection associated with a sub-query in the middle of a set of nested queries to trace the usage of an attribute associated with the sub-query. The system may analyze queries upstream, and downstream, of the selected sub-query to identify any queries in the set of nested queries that either (a) receive the attribute as an input attribute, or (b) apply at least one condition to the attribute.

As an example, a sub-query in a set of nested queries may receive as an input attribute an attribute with a name "customer ID." Upon receiving a selection to trace the usage of the attribute, the system may analyze the JSON data for an immediate parent query of the selected query to determine if the parent query includes the attribute "customer ID" as an input attribute. If so, the system analyzes each subsequent parent query until the system identifies a terminal parent query associated with the attribute. The system eventually identifies the terminal parent query, in the set of nested queries, that receives the attribute as an input. If the terminal parent query is an intermediate query among the set of nested queries, the terminal parent query would not include the attribute as an output attribute. Alternatively, if the terminal parent query is a top-most parent query in the hierarchy of nested queries, the terminal parent query may include the attribute as an output attribute. The system may execute rules to stop the analysis, or refrain from analyzing any further parent queries once the terminal parent query is identified.

The system displays visual indicators based on tracing usage of the attribute in the set of nested queries (Operation 218). For example, system may generate a visual indicator, such as a highlight or other symbol, for each sub-query between the selected query and the terminal parent query. The system may highlight one or both of the selected query and the terminal parent query differently than any intervening queries. The system may refrain from highlighting any queries that are not along a path between the selected query and the terminal parent query.

The system detects whether a selection is received to generate SQL code for a selected sub-query (Operation 220). In one embodiment, the nested query display region includes an interface element associated with a sub-query. When the system detects selection of the interface element, the system initiates operations to generate the SQL code for the selected sub-query. In addition, or in the alternative, the query detail region may include an interface element that, when selected, initiates operations to generate the SQL code for the selected sub-query.

Based on receiving the selection to generate the SQL code, the system identifies the queries, among the set of nested queries, for which to generate and display the SQL code (Operation 222). For example, the system may analyze the JSON code associated with the set of nested queries to identify a sub-set of queries for which to generate the SQL code, including: (a) the selected query, and (b) any child queries of the selected query. The system may omit from the sub-set of queries for which to generate the SQL code (a) any parent queries of the selected query and (b) any queries that are not child queries of the selected query.

The system converts JSON data for the sub-set of queries into SQL code (Operation 224). In one embodiment, the nested queries in the nested query display region define a compound query. As the system updates the queries based on user input to modify query characteristics, the system generates JSON data describing the compound query. The JSON data may be SQL-database-agnostic. The system may use the same JSON data to generate SQL-database code for multiple different SQL databases having different SQL dialects. Based on receiving the selection to generate and display SQL code, the system (a) identifies an SQL dialect and (b) generates SQL code in the SQL dialect for the sub-set of queries that includes (a) the selected query, and (b) the child queries of the selected query.

The system displays the SQL code (Operation 226). In one embodiment, the system generates a GUI window to overlay a nested query display region and a query detail region. The window may include the alphanumeric values representing the SQL code. If the system detects an input modifying the SQL code, the system may modify (a) the JSON data associated with the set of nested queries, and (b) the displayed information in one or both of the nested query display region and the query detail region of the GUI.

4. TRACING AN ORIGIN OF AN ATTRIBUTE TO A SUB-QUERY OF A SET OF NESTED QUERIES IN A COMPOSITE QUERY

Figure 3A:
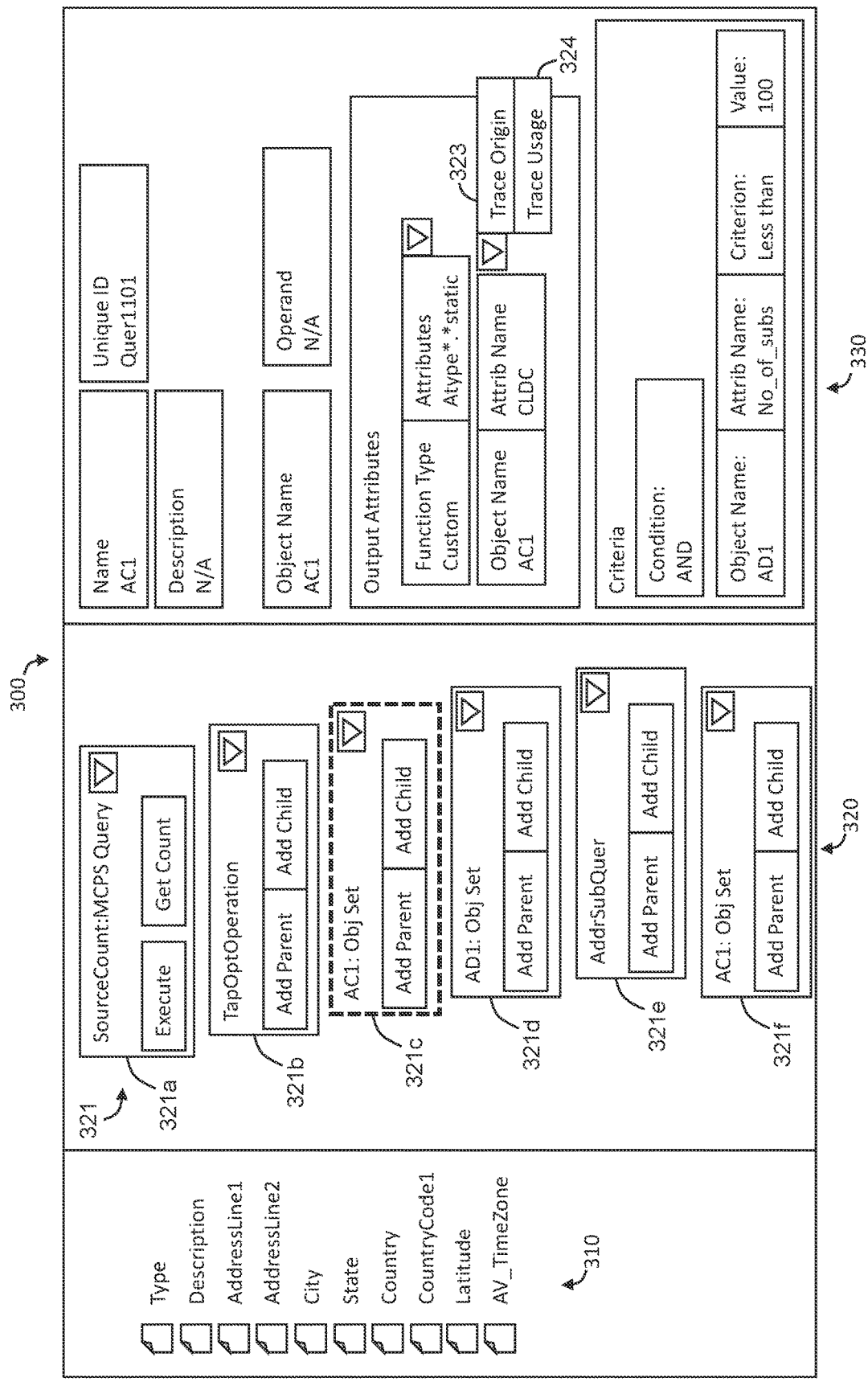
FIGS. 3A and 3B illustrates an example embodiment of a user interface for tracing a data attribute through a sub-set of queries in a set of nested queries to an origin query.
Figure 3B:
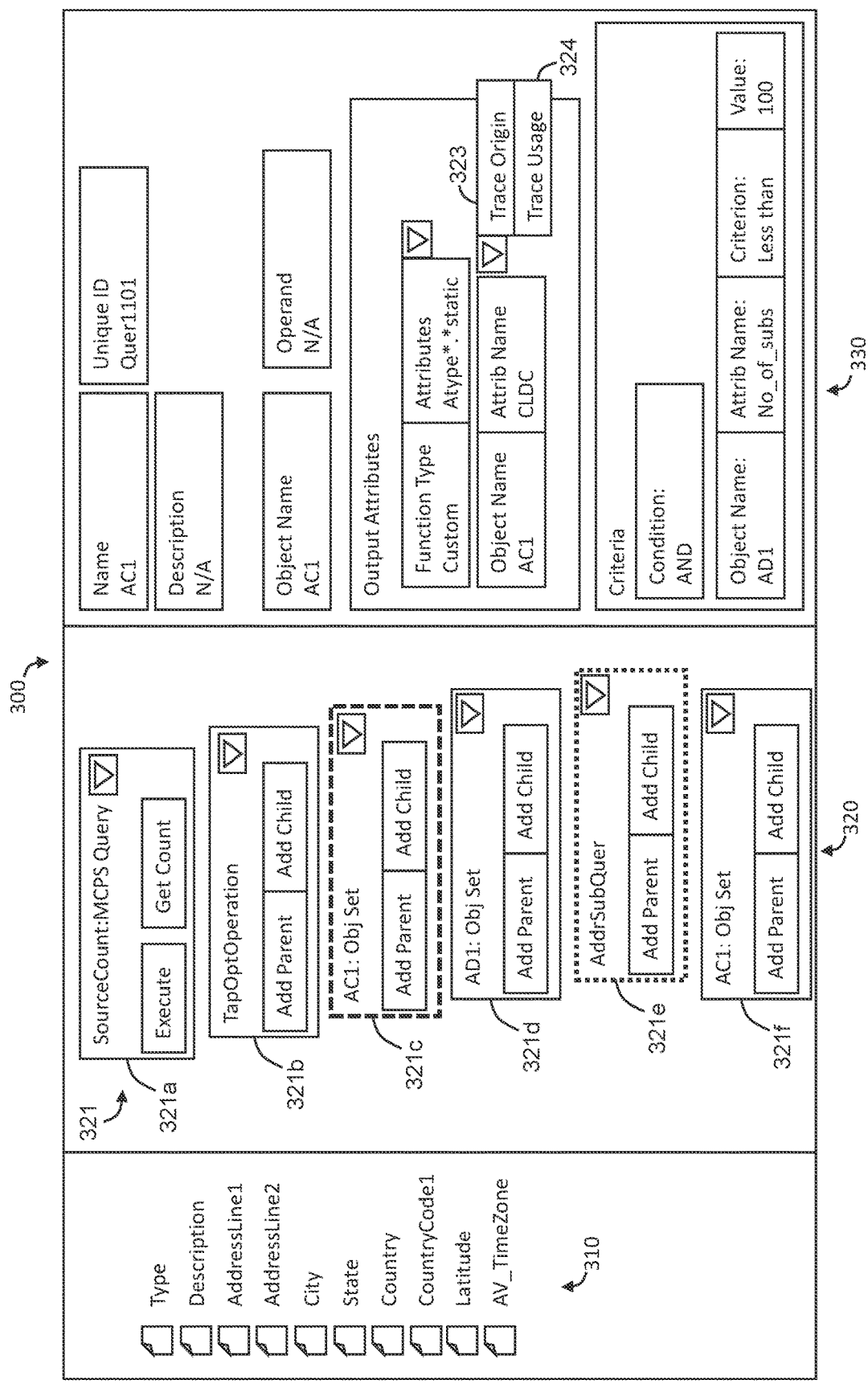

FIGS. 3A and 3B illustrate an example embodiment of a graphical user interface (GUI) for executing a sub-query among a set of nested queries. In one or more embodiments, an interactive graphical user interface (GUI) 300 includes a selectable metadata region 310, a nested query display region 320, and a query detail region 330. In one or more embodiments, a system displays one or both of the selectable metadata region 310 and the query detail region 330 simultaneously with the nested query display region 320.

The nested query display region 320 displays visual representation of a composite query 321 comprising a set of nested queries. In the example illustrated in FIGS. 3A and 3B, the visual representation 321a represents a parent query. Visual representation 321b represents a child query of the query represented by the visual representation 321a. Visual representation 321b is also a parent query of a child query represented by the visual representation 321c. The set of nested queries 321 further includes child queries 321d-321f. A child query may be referred to as a nested query. Each of the queries 321a-321f that make up the set of nested queries 321 is a sub-query. The sub-queries 321a-321f are configured to execute sequentially. The combined sub-queries 321a-321f that are configured to execute sequentially comprise a composite query. Based on receiving a selection to execute the top-most level parent query in the composite query, the system executes the child queries and then executes the top-most level parent query. Specifically, query 321b executes prior to query 321a; query 321c executes prior to query 321b; queries 321d and 321f execute prior to query 321c; and query 321e executes prior to query 321d.

In the description that follows, visual representations 321a-321f may be referred to as "queries" for ease of description, even though the visual representations 321a-321f only visually represent queries. The queries 321a-321f are arranged relative to each other in the nested query display region 320 to display a visual indicator of their nested relationships relative to each other. Query 321b is arranged below, and indented to the right, relative to query 321a to indicate query 321b is a child query of the query 321a. Similarly, query 321c is arranged below, and indented to the right, relative to query 321b to indicate query 321c is a child query of query 321b. In the present specification and claims, a child query is a query that is configured to begin execution following a start of execution of a parent query. The child query may return one or more results to the parent query. In one or more embodiments, the parent query performs one or more operations on results obtained from one or more child queries and outputs a result. Operations may include logical operations to filter returned results (such as "only return results containing value "1" for Attribute 1, and value "2" for Attribute 2). Operations may further include passing a set of results through a query to a parent query without performing a logical operation on the results to filter the results.

In one or more embodiments, the sub-queries 321a-321f include interface elements to trace the origin of a selected attribute. For example, as illustrated in FIG. 3A, query 321c is bounded by dashed lines indicating query 321c is a selected query. The query detail region 330 displays details regarding the characteristics of the query 321c. The query 321c includes an output attribute "CLDC." Interface element 323 is a selectable button associated with the attribute "CLDC." When the system receives a selection of the "trace origin" button 323, the system initiates operations to trace the attribute "CLDC" through the set of nested queries 321c to an origin query.

As illustrated in FIG. 3B, the GUI 300 change the functionality of the nested query display region 320 by providing a visual indication of one or more queries associated with the "trace origin" operation. In one example, the GUI 300 alters the visual information displayed in the nested query display region 320 to display a highlight (represented as a dotted outline) around the shape of the sub-query 321e as an indication that the sub-query 321e is the origin query of the attribute "CLDC."

In another example, the GUI 300 further changes the displayed information in the nested query display region 320 to generate a visual indicator, such as a highlight or other symbol, for each sub-query between the selected query and the origin query. For example, the GUI 300 may highlight the query 321c in a yellow highlight, the query 321e in a red highlight, and the query 321d in a gray highlight. The GUI 300 leave the visualizations of the queries 321a, 321b, and 321f unchanged from their visualizations prior to initiating the "trace origin" operation. The queries 321a, 321b, and 321f may not be changed to include any highlight or other visual indicators.

As illustrated in FIG. 3B, both the sub-query 321d and the sub-query 321f are child queries of the sub-query 321c. However, the sub-query 321f is not a child query of the sub-query 321d or the sub-query 321e. Accordingly, in an embodiment in which the sub-query 321e is the origin query of an attribute selected by the "trace origin" button 323 of the sub-query 321c, the GUI 300 may highlight the sub-queries 321d and 321e without highlighting the sub-query 321f.

In one or more embodiments, the GUI 300 may display additional attribute information associated with one or more sub-queries, including a selected query, an origin query, and any intervening queries. For example, in an embodiment in which the sub-query 321c is the selected query and the sub-query 321e is the origin query of a selected attribute, the GUI 300 may display a count of records associated with the selected attribute "CLDC." The GUI 300 may display additional information, such as a name of the attribute in the origin query, a data object or data table from which data associated with the attribute is retrieved by the origin query, and a function or operation performed on data retrieved by the origin query.

5. TRACING THE USAGE OF AN ATTRIBUTE THROUGHOUT A SET OF NESTED QUERIES IN A COMPOSITE QUERY

Figure 4:
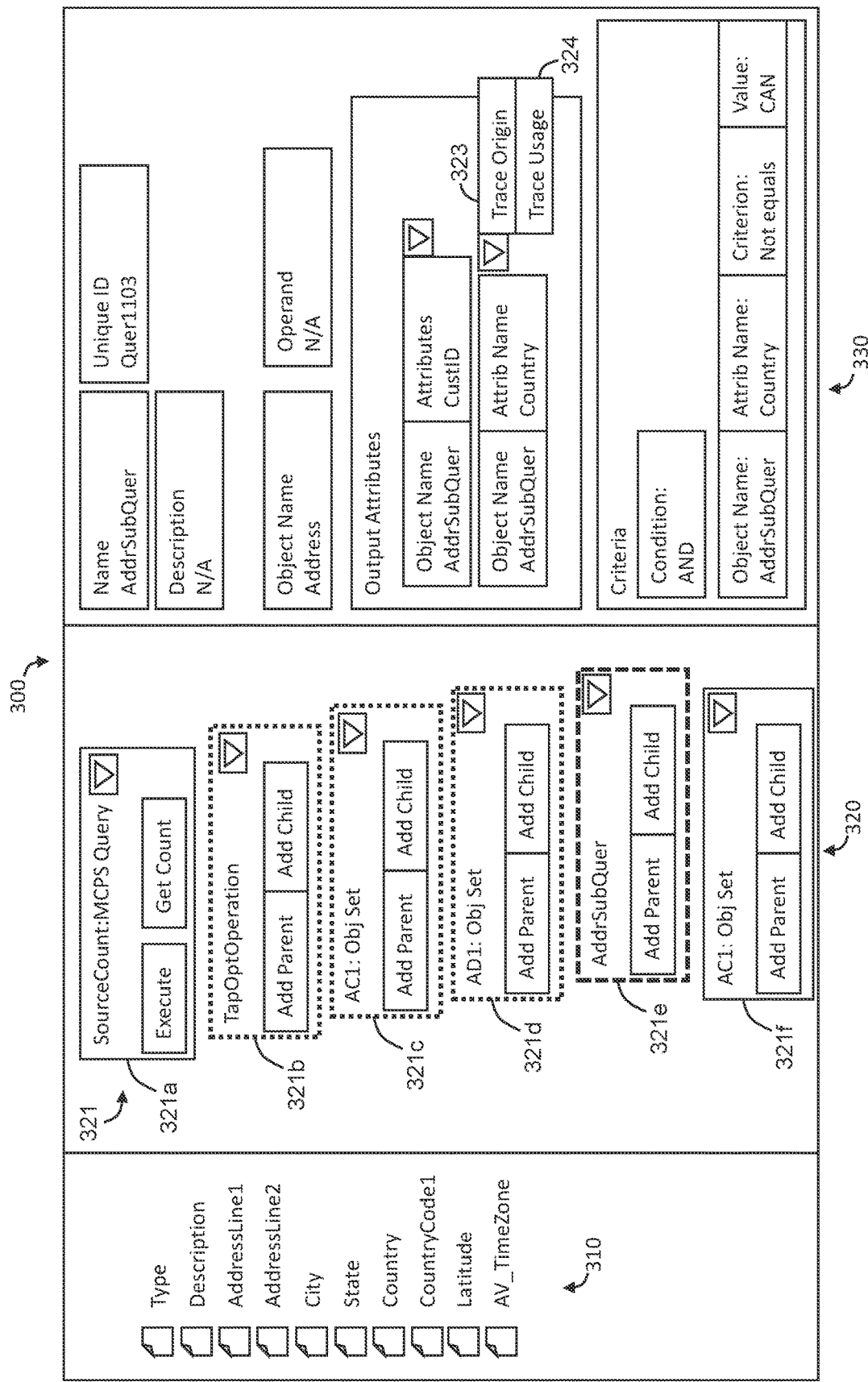
FIG. 4 illustrates an example embodiment of a user interface for tracing a usage of a query from an origin query through a sub-set of queries in a set of nested queries.

Referring to FIG. 4, query 321e is represented in dashed lines, indicating it is a selected query. The query detail region 330 includes details of the query 321e including output attributes "CustID" and "Country." The GUI 300 displays interface element 323 for the attribute "Country" to allow initiation of a "trace origin" operation. The GUI displays interface element 324 for the attribute "Country" to allow initiation of a "trace usage" operation. The system detects selection of the "trace usage" button 324 and analyzes JSON data for the set of nested queries 321 to identify the queries that include the attribute "Country" as an input attribute.

The GUI 300 changes the functionality of the nested query display region 320 by providing a visual indication of one or more queries associated with the "trace usage" operation. In one example, the GUI 300 alters the visual information displayed in the nested query display region 320 to display a highlight (represented as a dotted outline) around the shapes of the sub-queries 321b-321d as an indication that the sub-queries 321b-321d include the attribute "Country" as an input attribute.

In another example, the GUI 300 further changes the displayed information in the nested query display region 320 to generate a visual indicator, such as a highlight or other symbol, for each sub-query between the selected query and the terminal parent query that applies at least one condition to the attribute "Country." For example, the GUI 300 may highlight the query 321d in a yellow highlight, to indicate the query 321d merely passes the attribute through to a parent query without applying any condition to the attribute. The GUI 300 may highlight the query 321c in an orange highlight to indicate the query 321c applies a condition to the attribute "Country." For example, the query 321c may filter the results associated with the attribute "Country" to omit countries other than those in Asia. The GUI 300 may highlight the query 321b in a red highlight to indicate the query 321b is the terminal parent query of the attribute "Country."

In one or more embodiments, the GUI 300 may display additional attribute information associated with one or more sub-queries, including a selected query, a terminal parent query, and any intervening queries. For example, the GUI 300 may display a count of records associated with the selected attribute and the sub-queries 321b-321e. The GUI 300 may display additional information, such as a name of the attribute in one or more of the queries 321b-321e, a data object or data table from which data associated with the attribute is retrieved by the query 321e, and a function or operation performed by the queries 321b-321d on data associated with the selected attribute.

6. SQL CODE SELECTION IN INTERACTIVE QUERY BUILDER

Figure 5:
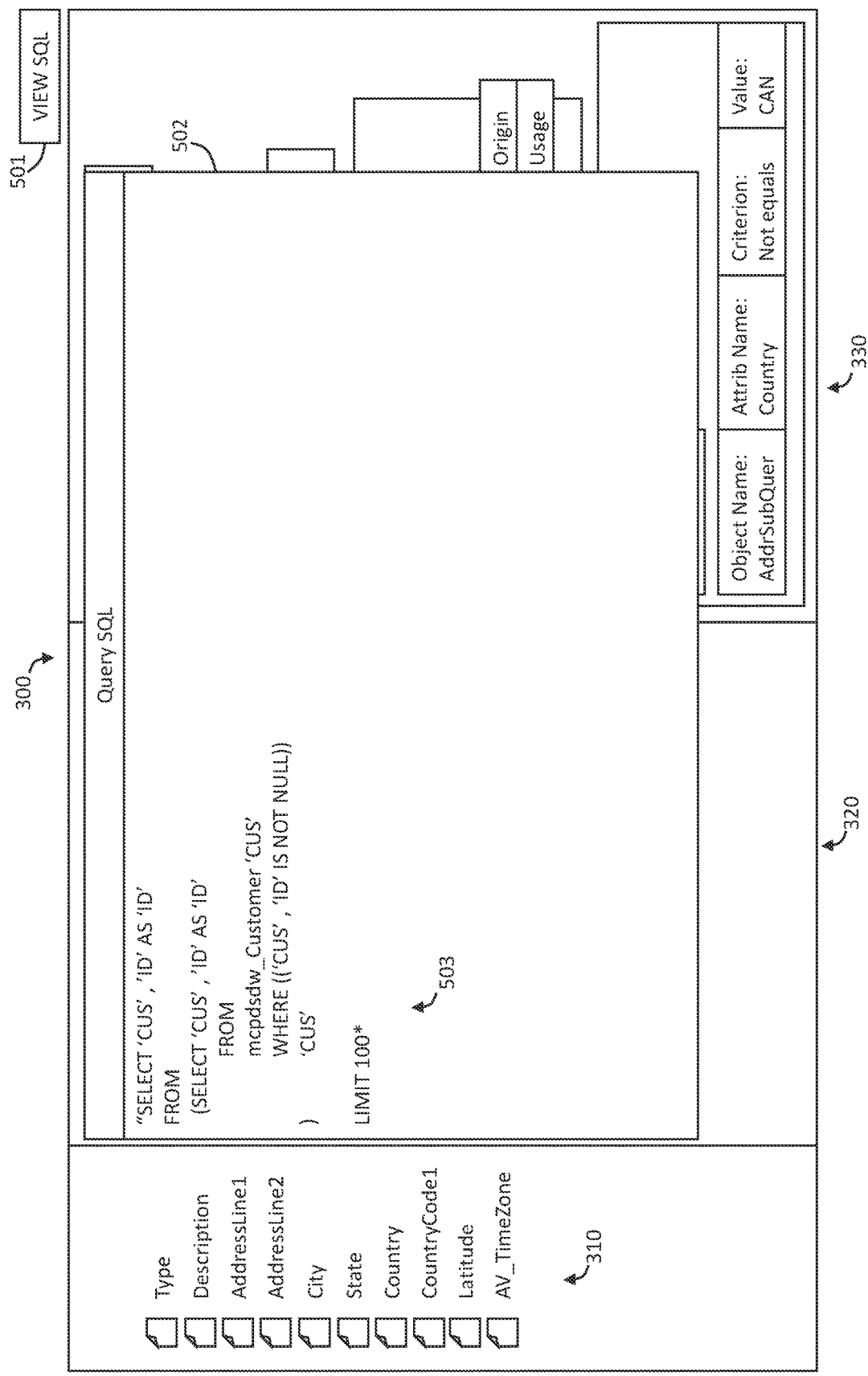
FIG. 5 illustrates an example embodiment of a user interface for generating and displaying SQL code for a sub-set of queries from a set of nested queries.

Referring to FIG. 5, the GUI 300 includes an interface element 501 to generate and display a sub-query as SQL code. For example, in FIG. 5, the interface element is the "view SQL" button 501. When a sub-query of a composite query is selected and the "view SQL" button 501 is selected, the GUI 300 displays a field 502 containing the SQL code 503 of the selected sub-query. In one or more embodiments, the system generates the SQL code by converting JSON data of the sub-query into the SQL code. In one or more embodiments, the field 502 is an editable field displayed concurrently with a portion of the nested query display region 320 or the query detail region 330. The field 502 provides changes the functionality of the GUI 300 by allowing a user to edit one or both of the representations of queries in the nested query display region 320 and characteristics of queries in the query detail region 330 by modifying alphanumeric text in the field 502.

In one or more embodiments, the system generates the SQL code 503 for a selected sub-query of a composite query without generating or displaying SQL code for any parent queries of the selected sub-query.

7. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

displaying, in a first region of a graphical user interface (GUI), a plurality of visual representations corresponding respectively to a plurality of nested queries of a composite query, the plurality of visual representations comprising:

a first visual representation representing a first query of the composite query; and a second visual representation representing a second query of the composite query, wherein the second query is a child query of the first query;

wherein the second visual representation is displayed relative to the first visual representation to depict the second query being the child query of the first query;

receiving a first input command to trace a usage of a first attribute associated with the second query;

responsive to receiving the first input command:

determining that the first query is a parent query of the second query;

determining that the first query receives the first attribute as an input attribute from the second query; and based on determining that the first query receives the first attribute as an input attribute, displaying a visual indicator associated with the first query.

2. The non-transitory computer readable medium of claim 1, wherein the operations further comprise:

based on determining that the first query receives the first attribute as an input attribute from the second query, displaying a second visual indicator associated with the second query.

3. The non-transitory computer readable medium of claim 1, wherein the composite query includes a plurality of parent queries, arranged hierarchically in the plurality of nested queries, wherein at least two parent queries of the plurality of parent queries receive the first attribute as an input attribute from the second query; and wherein the operations further comprise:

based on determining the at least two parent queries receive the first attribute as an input attribute from the second query: displaying the visual indicator associated with each of the at least two parent queries receiving the first attribute from the second query.

4. The non-transitory computer readable medium of claim 1, wherein the composite query includes a plurality of parent queries, arranged hierarchically in the plurality of nested queries, wherein at least two parent queries of the plurality of parent queries receive the first attribute as an input attribute from the second query; and wherein the operations further comprise:

based on determining that (a) a first parent query, among the plurality of parent queries, applies a first condition to the first attribute, and (b) a second parent query, among the plurality of parent queries, applies a second condition to the first attribute:
displaying a different visual indicator for the first parent query and the second parent query.

5. The non-transitory computer readable medium of claim 1, wherein the plurality of visual representations includes a third visual representation representing a third query of the composite query,
wherein the third query is a parent query of the first query, and
wherein operations further comprise:
based on determining that the third query does not receive the first attribute as an input attribute from the first query: refraining from displaying the visual indicator associated with the third query.

6. The non-transitory computer readable medium of claim 1, wherein the visual indicator includes a count of results returned by the first query.

7. The non-transitory computer readable medium of claim 1, wherein receiving the first input command to trace the usage of the first attribute associated with the second query comprises:
receiving a user input to edit or delete the second query.

8. The non-transitory computer readable medium of claim 1, wherein the operations further comprise:
determining that the second query is a parent query of a third query;
determining that the second query receives the first attribute as an input attribute from the third query; and
based on determining that the second query receives the first attribute as an input attribute, displaying a visual indicator associated with the second query.

9. The non-transitory computer readable medium of claim 1, wherein the operations further comprise:
determining that the second query is a parent query of a third query;
determining that the second query receives the first attribute as an input attribute from the third query; and
based on determining that the second query receives the first attribute as an input attribute from the third query, refraining from displaying a visual indicator associated with the third query.

10. The non-transitory computer readable medium of claim 1, wherein the operations further comprise:
receiving a second input associated with the second visual representation;
responsive to receiving the second input:
generating SQL code for executing the second query, without generating SQL code for executing the first query; and
displaying, concurrently with the first region of the GUI, the SQL code for executing the second query.

11. The non-transitory computer readable medium of claim 10, wherein the SQL code for executing the second query is displayed in an editable field.

12. The non-transitory computer readable medium of claim 11, wherein the instructions further cause performance of operations comprising:
based on detecting a selection of the second visual representation in the first region: displaying, in a second region of the GUI, displayed concurrently with the first region, characteristics of the second query; and
based on detecting a modification to the SQL code in the editable field, modifying at least one characteristic of the second query in the second region of the GUI.

13. The non-transitory computer readable medium of claim 10, wherein the instructions further cause performance of operations comprising:
generating JSON data for the first query and the second query,
wherein the SQL code for executing the second query is generated based on the JSON data for the second query, without using the JSON data for the first query.

14. A method, comprising:
displaying, in a first region of a graphical user interface (GUI), a plurality of visual representations corresponding respectively to a plurality of nested queries of a composite query, the plurality of visual representations comprising:
a first visual representation representing a first query of the composite query; and
a second visual representation representing a second query of the composite query,
wherein the second query is a child query of the first query;
wherein the second visual representation is displayed relative to the first visual representation to depict the second query being the child query of the first query;
receiving a first input command to trace a usage of a first attribute associated with the second query;
responsive to receiving the first input command:
determining that the first query is a parent query of the second query;
determining that the first query receives the first attribute as an input attribute from the second query; and
based on determining that the first query receives the first attribute as an input attribute, displaying a visual indicator associated with the first query.

15. The method of claim 14, further comprising:
based on determining that the first query receives the first attribute as an input attribute from the second query, displaying a visual indicator associated with each of the first query and the second query.

16. The method of claim 14, wherein the composite query includes a plurality of parent queries, arranged hierarchically in the plurality of nested queries, wherein at least two parent queries of the plurality of parent queries receive the first attribute as an input attribute from the second query; and
wherein the operations further comprise:
based on determining the at least two parent queries receive the first attribute as an input attribute from the second query: displaying the visual indicator associated with each of the at least two parent queries receiving the first attribute from the second query.

17. The method of claim 14, wherein the composite query includes a plurality of parent queries, arranged hierarchically in the plurality of nested queries, wherein at least two parent queries of the plurality of parent queries receive the first attribute as an input attribute from the second query; and
wherein the operations further comprise:
based on determining that (a) a first parent query, among the plurality of parent queries, applies a first condition to the first attribute, and (b) a second parent query, among the plurality of parent queries, applies a second condition to the first attribute:
displaying a different visual indicator for the first parent query and the second parent query.

18. The method of claim 14, wherein the plurality of visual representations includes a third visual representation representing a third query of the composite query, wherein the third query is a parent query of the first query, and wherein operations further comprise:

based on determining that the third query does not receive the first attribute as an input attribute from the first query: refraining from displaying the visual indicator associated with the third query.

19. The method of claim 14, wherein the visual indicator includes a count of results returned by the first query.

20. A system comprising:

one or more processors; and memory storing instructions that, when executed by the one or more processors, cause the system to perform:

displaying, in a first region of a graphical user interface (GUI), a plurality of visual representations corresponding respectively to a plurality of nested queries of a composite query, the plurality of visual representations comprising:

a first visual representation representing a first query of the composite query; and a second visual representation representing a second query of the composite query, wherein the second query is a child query of the first query;

wherein the second visual representation is displayed relative to the first visual representation to depict the second query being the child query of the first query;

receiving a first input command to trace a usage of a first attribute associated with the second query;

responsive to receiving the first input command:

determining that the first query is a parent query of the second query;

determining that the first query receives the first attribute as an input attribute from the second query; and based on determining that the first query receives the first attribute as an input attribute, displaying a visual indicator associated with the first query.

\* \* \* \* \*